Patented Apr. 3, 1934

1,953,548

UNITED STATES PATENT OFFICE 1,953,548

PREPARATION OF NORMAL PROPYL ALCOHOL

Charles O. Young and George H. Law, Charleston, W. Va., assignors to Carbide & Carbon Chemicals Corp., a corporation of New York No Drawing. Application January 3, 1931, Serial No. 506,496

6 Claims. (Cl. 260—156)

The invention is a process for making n-propyl alcohol from propylene oxide. According to this invention propylene oxide vapor, with or without the addition of water vapor, is passed successively through two catalyst chambers. The first chamber contains a catalyst, such as alumina, heated to 250° to 400° C., and the second contains a hydrogenating catalyst, such as nickel, at a temperature of 125° to 170° C. Hydrogen must be supplied to the reaction gases in the second chamber, but may be introduced with the original vapor at the start of the process. The resultant product contains a mixture of n-propyl alcohol, propionaldehyde and unchanged propylene oxide. The latter two substances may be separated from the n-propyl alcohol by well known methods, and returned to the process for further production of n-propyl alcohol.

The following description of a typical operation of the process is illustrative of the invention:

The catalysts were contained in copper tubes one inch in diameter, and approximately thirty inches long connected in series. A mixture of propylene oxide vapor, hydrogen and water vapor was passed through the tubes. The mixture contained about four molecules of hydrogen to each molecule of propylene oxide and about 10% of water vapor. The rate of flow through the catalyst chambers was from 0.8 grams to 2.0 grams of propylene oxide per minute. This rate of flow is equivalent to a space velocity of from about 48 to about 120 volumes of propylene oxide per volume of the first catalyst tube per hour, calculated at standard conditions. The first tube, containing the alumina catalyst, was maintained at a temperature of 275° C., and the second tube, containing the nickel catalyst, was operated at 150° C. Six hundred and ninety-five grams of propylene oxide were passed through the tubes. The exit gases contained 255 grams of n-propyl alcohol, 95 grams of propionaldehyde and 316 grams of unchanged propylene oxide. The unchanged propylene oxide and the propionaldehyde were separated from the n-propyl alcohol by rectification and returned to the process.

The alumina catalyst was prepared by precipitating aluminum hydroxide by the addition of ammonium hydroxide to a solution of aluminum nitrate, followed by washing and drying the precipitate. A satisfactory catalyst may also be prepared by steaming and drying aluminum isopropylate, or by any other known method of preparing an active form of alumina. The nickel catalyst was prepared by impregnating filtros chips with a solution of nickel nitrate, followed by roasting and reduction with hydrogen at 250° C. Any other form of active nickel may be used satisfactorily.

The process is not limited to the conditions specified in the foregoing example. The ratio of hydrogen to propylene oxide may vary between wide limits, but it is advantageous to use an excess of hydrogen. Also, the hydrogen may be introduced at any point in the system prior to the passage of the gases through the hydrogenating catalyst chamber. While the addition of water vapor is not essential to the operation of the process, we have found that the formation of undesirable by-products and consequent loss of valuable material, is minimized if a small quantity of water vapor is admixed with the reaction vapors.

Although alumina and nickel are the preferred catalysts, other contact catalysts known to be the equivalent of alumina may be used, and other metals which act as hydrogenating catalysts may be substituted for the preferred nickel.

We claim:

1. A process for making n-propyl alcohol which comprises passing propylene oxide vapor at a space velocity of from about 48 to about 120 volumes per volume per hour over a contact catalyst containing alumina heated to 250° to 400° C. and immediately thereafter, in the presence of hydrogen, over a hydrogenating catalyst containing reduced nickel at a temperature of 125° to 170° C.

2. A process for making n-propyl alcohol which comprises passing propylene oxide vapor admixed with water vapor successively over a catalyst containing alumina heated to 250° to 400° C. and, in the presence of hydrogen, over a catalyst containing reduced nickel at a temperature of 125° to 170° C.

3. A process for making n-propyl alcohol which comprises passing propylene oxide vapor at a space velocity of from about 48 to about 120 volumes per volume per hour over an alumina catalyst heated to about 275° C. and immediately thereafter, in the presence of an excess of hydrogen such that the molecular ratio of hydrogen to propylene oxide is about four to one, over a catalyst containing reduced nickel at a temperature of about 150° C.

4. A process for making n-propyl alcohol which comprises passing a mixture, containing propylene oxide vapor and hydrogen in the molecular ratio of about one to four respectively and about 10% water vapor, successively over an alumina catalyst heated to about 275° C. and over a catalyst containing reduced nickel at a temperature of about 150° C., and separating the n-propyl alcohol from the other products of reaction.

5. A process for making n-propyl alcohol which comprises passing a mixture containing propylene oxide vapor and water vapor successively over an alumina catalyst heated to between 250° and 400° C., and in the presence of hydrogen over a catalyst containing reduced nickel at a temperature of about 125° to 170° C., and thereafter separating n-propyl alcohol from the products so formed.

6. A process for making n-propyl alcohol which comprises passing propylene oxide vapor successively over an alumina catalyst heated to about 275° C. and in the presence of hydrogen and water vapor over a catalyst containing reduced nickel at about 150° C., the molecular ratio of hydrogen to propylene oxide over said nickel-containing catalyst being about 4 to 1 and the quantity of water vapor being about 10% of the mixture, said vapors being passed over said catalysts at the rate of from about 1.0 to 2.5 grams of propylene oxide per liter of catalysts per minute.

GEORGE H. LAW.
CHARLES O. YOUNG.